US010244780B2

(12) United States Patent
Jung et al.

(10) Patent No.: US 10,244,780 B2
(45) Date of Patent: Apr. 2, 2019

(54) FOOD PRESERVATION SYSTEM

(71) Applicant: YUAN ZE UNIVERSITY, Taoyuan (TW)

(72) Inventors: Guo-Bin Jung, Taoyuan County (TW); Chia-Chen Yeh, Miaoli County (TW); Jyun-Wei Yu, Taoyuan (TW); Chia-Ching Ma, Taoyuan (TW); Chung-Wei Hsieh, Tainan (TW); Cheng-Lung Lin, Taichung (TW); Kuan-Fu Liao, New Taipei (TW); Jing-Yu Hu, Taoyuan (TW)

(73) Assignee: YUAN ZE UNIVERSITY, Taoyuan (TW)

( * ) Notice: Subject to any disclaimer, the term of this patent is extended or adjusted under 35 U.S.C. 154(b) by 442 days.

(21) Appl. No.: 15/259,736

(22) Filed: Sep. 8, 2016

(65) Prior Publication Data

US 2017/0360070 A1 Dec. 21, 2017

(30) Foreign Application Priority Data

Jun. 17, 2016 (TW) .............................. 105119127 A (51) Int. Cl.
*A23L 3/34* (2006.01)
*A23B 7/14* (2006.01)
(Continued)

(52) U.S. Cl.
CPC ............ *A23L 3/3445* (2013.01); *A23B 7/152* (2013.01); *A23B 7/153* (2013.01); *A23L 3/3409* (2013.01);
(Continued)

(58) Field of Classification Search
CPC .. A23L 3/00; A23L 3/34–3/3418; A21D 4/00; A23B 4/0053; A23B 4/021;
(Continued)

(56) References Cited

U.S. PATENT DOCUMENTS 5,163,360 A * 11/1992 Petz ...................... A23B 7/148
212/226
8,887,944 B2 * 11/2014 Deane ................ B65D 81/3802
206/499

(Continued)

FOREIGN PATENT DOCUMENTS

CN 101223406 A 7/2008
CN 101676644 A 3/2010
(Continued)

*Primary Examiner* — Michael A Laflame, Jr.
(74) *Attorney, Agent, or Firm* — Li & Cai Intellectual Property (USA) Office (57) ABSTRACT

A food preservation system is provided. The system includes a storage cabinet for storing foods, an electrolytic gas generator, a gas sensor and a control unit. The electrolytic gas generator is in fluid communication with the storage cabinet to output a first gas and a second gas to preserve the foods. The gas sensor is arranged in the storage cabinet to detect the concentration of the gases in the storage cabinet for obtaining gas concentration information which includes a first gas concentration and a second gas concentration. The control unit is electrically connected to the electrolytic gas generator and the gas sensor. According to the received gas concentration information, the control unit adjusts the applied voltage of the electrolytic gas generator to control the gas species generated by the electrolytic gas generator and the first and second gas concentrations in the storage cabinet.

16 Claims, 3 Drawing Sheets

(51) Int. Cl.
*A23B 7/144* (2006.01)
*A23B 9/16* (2006.01)
*A23B 4/16* (2006.01)
*A23B 5/08* (2006.01)
*A23B 5/10* (2006.01)
*A23L 3/3445* (2006.01)
*A23L 3/3409* (2006.01)
*A23B 7/152* (2006.01)
*A23B 7/153* (2006.01)

(52) U.S. Cl.
CPC ....... *A23L 3/34095* (2013.01); *A23V 2002/00* (2013.01); *Y02E 60/366* (2013.01)

(58) Field of Classification Search
CPC ...... A23B 4/14–4/16; A23B 5/08–5/10; A23B 7/14–7/144; A23B 9/16–9/22
See application file for complete search history.

(56) References Cited

U.S. PATENT DOCUMENTS

| | | | | |
|---|---|---|---|---|
| 2006/0192001 | A1* | 8/2006 | Shaffer | G06Q 10/087 235/385 |
| 2008/0003334 | A1* | 1/2008 | Bell | A23B 4/16 426/236 |
| 2008/0159910 | A1* | 7/2008 | Dick | A23B 7/152 422/40 |
| 2008/0193614 | A1* | 8/2008 | Greiner | F24C 7/08 426/231 |
| 2009/0199577 | A1* | 8/2009 | Owada | A23L 3/32 62/66 |
| 2010/0025267 | A1* | 2/2010 | Brand | A47G 19/2227 206/216 |
| 2011/0085934 | A1* | 4/2011 | Joshi | A23L 3/3409 422/5 |
| 2011/0198215 | A1* | 8/2011 | Bahar | C09K 5/041 204/241 |
| 2014/0050831 | A1* | 2/2014 | Itzhak | A23B 7/015 426/419 |
| 2014/0208795 | A1* | 7/2014 | Bell | F25D 17/042 62/419 |
| 2014/0284239 | A1* | 9/2014 | Espinosa | B65D 81/00 206/459.5 |
| 2014/0326021 | A1* | 11/2014 | Wagner | A62C 99/0018 62/617 |
| 2014/0352351 | A1* | 12/2014 | Xu | C09K 5/16 62/476 |
| 2016/0245577 | A1* | 8/2016 | Klingshirn | F25D 17/042 |
| 2016/0252297 | A1* | 9/2016 | Jeong | F25D 29/00 62/62 |
| 2016/0366919 | A1* | 12/2016 | van Someren Greve | A23L 3/34095 |
| 2017/0339968 | A1* | 11/2017 | Edelman | A23B 7/00 |
| 2018/0087794 | A1* | 3/2018 | Bahar | F24F 3/166 |
| 2018/0250431 | A1* | 9/2018 | Eide | A61L 9/046 |

FOREIGN PATENT DOCUMENTS

| | | |
|---|---|---|
| CN | 102016463 A | 4/2011 |
| CN | 202626310 U | 12/2012 |
| CN | 103423945 A | 12/2013 |
| CN | 105091467 A | 11/2015 |
| JP | 10-225507 A | 8/1998 |

* cited by examiner

FOOD PRESERVATION SYSTEM

BACKGROUND

1. Technical Field

The instant disclosure relates to a food preservation system, in particular, to a food preservation system employing proton exchange membrane (PEM) technique.

2. Description of Related Art

One of the widely used food preservation methods in the food industry is to place the foods in low-temperature environments to prevent the spoilage of foods. Another method is to store the foods in packages, after vacuum or filling with nitrogen gas, to extend the shelf life of the foods.

However, the above methods only inhibit the growth of bacteria that are harmful to the human body and cannot achieve the effect of sterilization. The use of chemicals or preservatives to extend the shelf life of the food may also damage human health.

SUMMARY

In view of the problems above, the instant disclosure provides a food preservation system which employs proton exchange membrane (PEM) electrolysis technique for generating hydrogen gas, oxygen gas and ozone to perform sterilization on foods, and adjusts the concentrations of the hydrogen gas, oxygen gas and ozone to provide a suitable environment for storing foods.

An embodiment of the present disclosure provides a food preservation system comprising a storage cabinet, an electrolytic gas generator, a gas detector and a control unit. The storage cabinet stores foods. The electrolytic gas generator is in fluid communication with the storage cabinet and outputs a first gas and a second gas to the storage cabinet for preserving the foods. The gas detector is disposed in the storage cabinet for detecting a gas in the storage cabinet and obtaining gas concentration information. The gas concentration information comprises a first gas concentration and a second gas concentration. The control unit is electrically connected to the electrolytic gas generator and the gas detector. The control unit adjusts a voltage value of the electrolytic gas generator according to the gas concentration information and the control unit controls the type of gases generated by the electrolytic gas generator by adjusting the voltage value, and adjusts the concentration of the first gas and the second gas in the storage cabinet.

To sum up, the food preservation system provided by the instant disclosure preserves the foods by inputting the hydrogen gas, oxygen gas and ozone generated by the electrolytic gas generator, thereby extending the shelf life of the foods.

In order to further understand the techniques, means and effects of the instant disclosure, the following detailed descriptions and appended drawings are hereby referred to, such that, and through which, the purposes, features and aspects of the instant disclosure can be thoroughly and concretely appreciated; however, the appended drawings are merely provided for reference and illustration, without any intention to be used for limiting the instant disclosure.

BRIEF DESCRIPTION OF THE DRAWINGS

The accompanying drawings are included to provide a further understanding of the instant disclosure, and are incorporated in and constitute a part of this specification. The drawings illustrate exemplary embodiments of the instant disclosure and, together with the description, serve to explain the principles of the instant disclosure.

DESCRIPTION OF THE EXEMPLARY EMBODIMENTS

Reference will now be made in detail to the exemplary embodiments of the instant disclosure, examples of which are illustrated in the accompanying drawings. Wherever possible, the same reference numbers are used in the drawings and the description to refer to the same or like parts.

Figure 1:
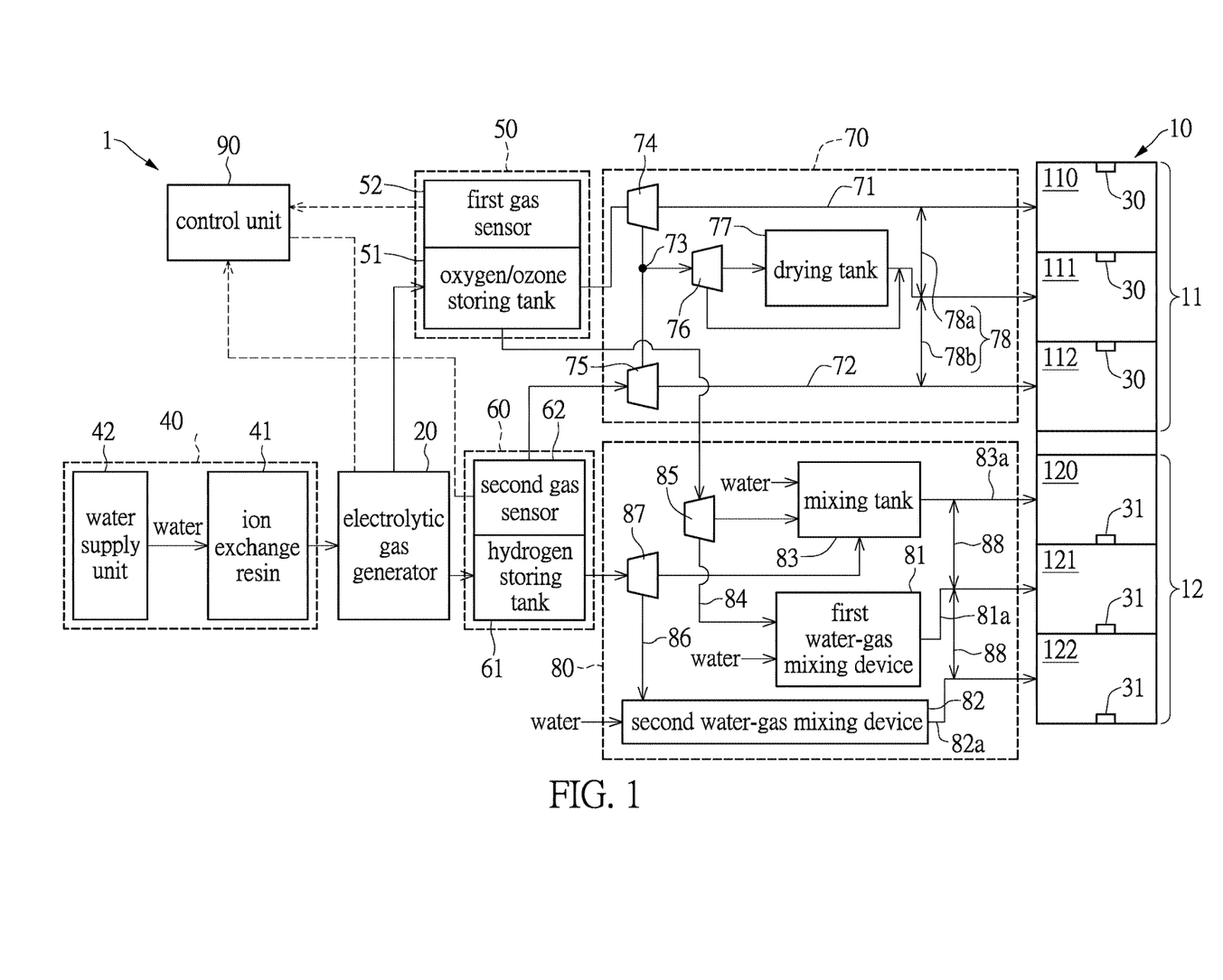
FIG. 1 is a function block diagram of the food preservation system of the embodiments of the instant disclosure.

FIG. 1 is a function block diagram of the food preservation system of the embodiments of the instant disclosure. The food preservation system 1 of the embodiments of the instant disclosure employs the hydrogen gas, oxygen gas and ozone generated by water electrolysis for preserving foods. The method for preserving foods includes sterilization, anti-oxidation or providing gases suitable for storing foods.

Specifically, the food preservation system 1 comprises a storage cabinet 10, an electrolytic gas generator 20, a gas detector 30 and the control unit 90.

The storage cabinet 10 is for storing foods such as meats, seafood, vegetables, fruits or dried foods. In addition, in order to provide an environment suitable for storing foods, the storage cabinet 10 can have a cooling device or a temperature or humidity controller for controlling the temperature and the humidity in the storage cabinet 10.

In the embodiments of the instant disclosure, the inner portion of the storage cabinet 10 is at least divided into a gas preserving area 11 and a liquid preserving area 12 separated from the gas preserving area 11. A gas and a liquid are input into the gas preserving area 11 and the liquid preserving area 12 respectively for preserving foods through different means, for example, sterilization, anti-oxidation or providing an environment suitable for storing foods. In another embodiment, the storage cabinet 10 can only have the gas preserving area 11 or the liquid preserving area 12.

In the embodiments of the instant disclosure, the gas preserving area 11 can be further divided into a plurality of independent gas processing chambers. These gas processing chambers have different gases input therein for performing the preservation of foods in each gas processing chamber. In an embodiment, the gas processing chambers at least comprise a gas sterilization chamber 110, a gas preservation chamber 111 and a gas anti-oxidation chamber 112, and the gas sterilization chamber 110, the gas preservation chamber 111 and the gas anti-oxidation chamber 112 are separated from each other.

Oxygen gas and ozone are input into the gas sterilization chamber 110 for performing sterilization to the foods. For example, the gas containing ozone and oxygen provided in the gas sterilization chamber 110 can kill the listeria monoxytogenes in chicken meats to ensure food safety.

Hydrogen gas can be input into the gas anti-oxidation chamber 112. Hydrogen gas can interfere with the chemicals that may perform free radical reactions and remove the free radicals, thereby inhibiting the speed of oxidation and controlling the oxidation value. Therefore, meats or oil products can be stored in the gas anti-oxidation chamber 112. In an embodiment, the concentration of hydrogen gas is about 0.8 to 1.3 mM. The above concentration can achieve the effect of anti-oxidation.

In addition, a mixed gas of oxygen, ozone and hydrogen can be input into gas preservation chamber 111 for providing a better storing environment for the foods stored in the gas preservation chamber 111. For example, the oxygen gas in the mixed gas can inhibit the growth of bacteria and ensure the quality of vegetables and fruit, thereby extending their shelf life. To be specific, the oxygen gas can inhibit the growth and reproduction of anaerobic bacteria, and maintain the red colors of pork, beef and lamb. The ozone in the mixed gas has strong oxidative property and is easy to decompose and hence, can be used to perform sterilization, deodorization, purification, preservation and facilitate the decomposition of remained pesticides. The hydrogen gas in the mixed gas can be used as an anti-oxidation agent and can eliminate the use of chemicals for preserving foods.

In an embodiment, the hydrogen concentration in the mixed gas is from about 0.8 to 1.3 mM, the concentration of ozone is about 2-3 ppm, and the concentration of oxygen gas is 75%.

Regarding foods that need to be cleaned before being stored, they can be transferred to the liquid preserving area 12 for preserving. Similarly, the liquid preserving area 12 can be divided into a liquid sterilization chamber 121, a liquid preservation chamber 120 and a liquid anti-oxidation chamber 122 separated from each other.

For example, water rich in oxygen and ozone can be input into the liquid sterilization chamber 121 for performing sterilization or removing any pesticide residue on the vegetables or fruits.

Hydrogen-rich water can be input into the liquid anti-oxidation chamber 122 to preserve vegetables or fruits, thereby delaying the aging of the fruits and extending the shelf life of the food products. For example, by placing harvested kiwi in hydrogen-rich water for a predetermined time can reduce the dissolving of pectin and the activation of cellulase, thereby delaying the softening of the kiwi and reducing the oxidation damage of the kiwi.

A mixed solution containing oxygen gas, ozone and hydrogen gas can be directly input into the liquid preservation chamber 120, or a mixed solution containing only oxygen gas and hydrogen gas can be directly input into the liquid preservation chamber 120 for preserving foods. The dissolved concentrations of oxygen gas, ozone and hydrogen gas in the mixed solution can be adjusted according to actual need to achieve the above objectives.

In the embodiments of the instant disclosure, the hydrogen gas, oxygen gas or ozone generated by the electrolytic gas generator 20 are directly input into the gas preserving area 11 for performing preservation. Alternatively, at least one of the hydrogen gas, the oxygen gas and ozone generated by the electrolytic gas generator 20 are mixed with water and then input into the liquid preserving area 12.

Specifically, the electrolytic gas generator 20 is in fluid communication with the storage cabinet 10, and the electrolytic gas generator 20 electrolyzes water to generate the first gas and the second gas for preserving the foods in the storage cabinet 10. According to the voltage value applied during the electrolysis of water, the first gas can only contain oxygen gas, or can contain both oxygen gas and ozone, and the second gas is hydrogen gas.

The electrolytic gas generator 20 is a proton exchange membrane (PEM) electrolytic gas generator which is used to generate a high concentration of hydrogen gas, oxygen gas and ozone without any nitrogen oxide.

The food preservation system 1 of the embodiments of the instant disclosure further comprises a pure water supplying device 40 communicated to the electrolytic gas generator 20 for supplying water to the electrolytic gas generator 20. As shown in FIG. 1, in the present embodiment, the pure water supplying device 40 comprises a water supply unit 42 and an ion exchange resin 41, in which the water provided by the water supply unit 42 is provided to the electrolytic gas generator 20 after passing the ion exchange resin 41 for removing the anions and cations dissolved in the water. In an embodiment, the water supply unit 42 can be a water storing tank or a water input pipeline.

Figure 2:
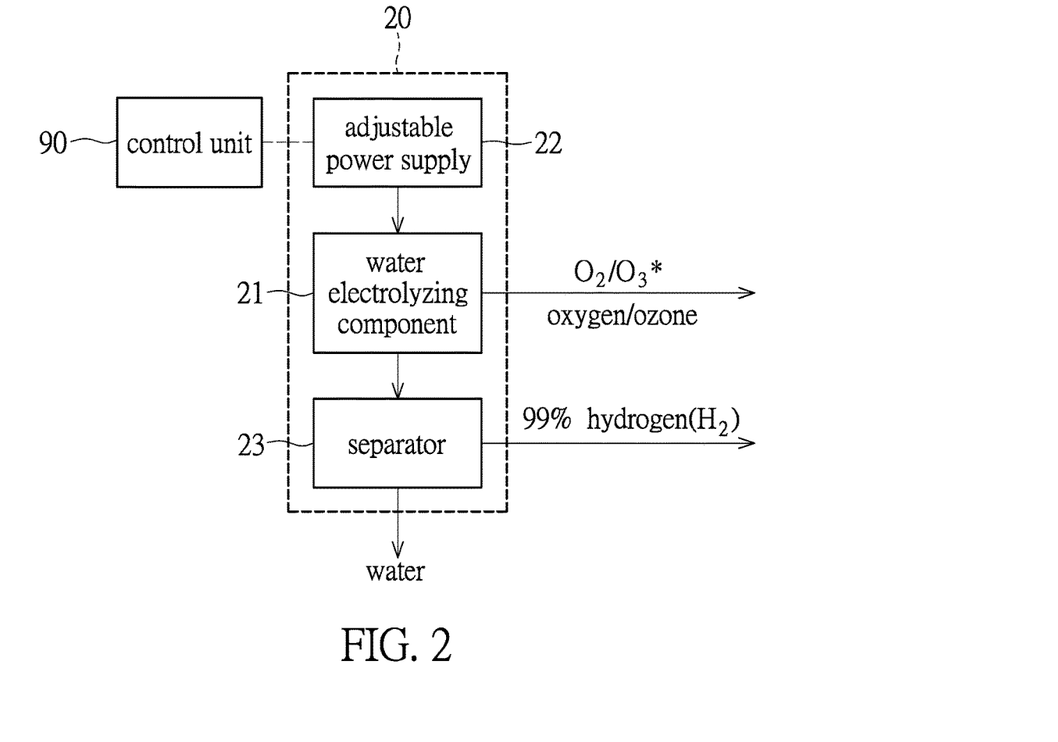
FIG. 2 is a function block diagram of the electrolytic gas generator of the embodiments of the instant disclosure.
Figure 3:
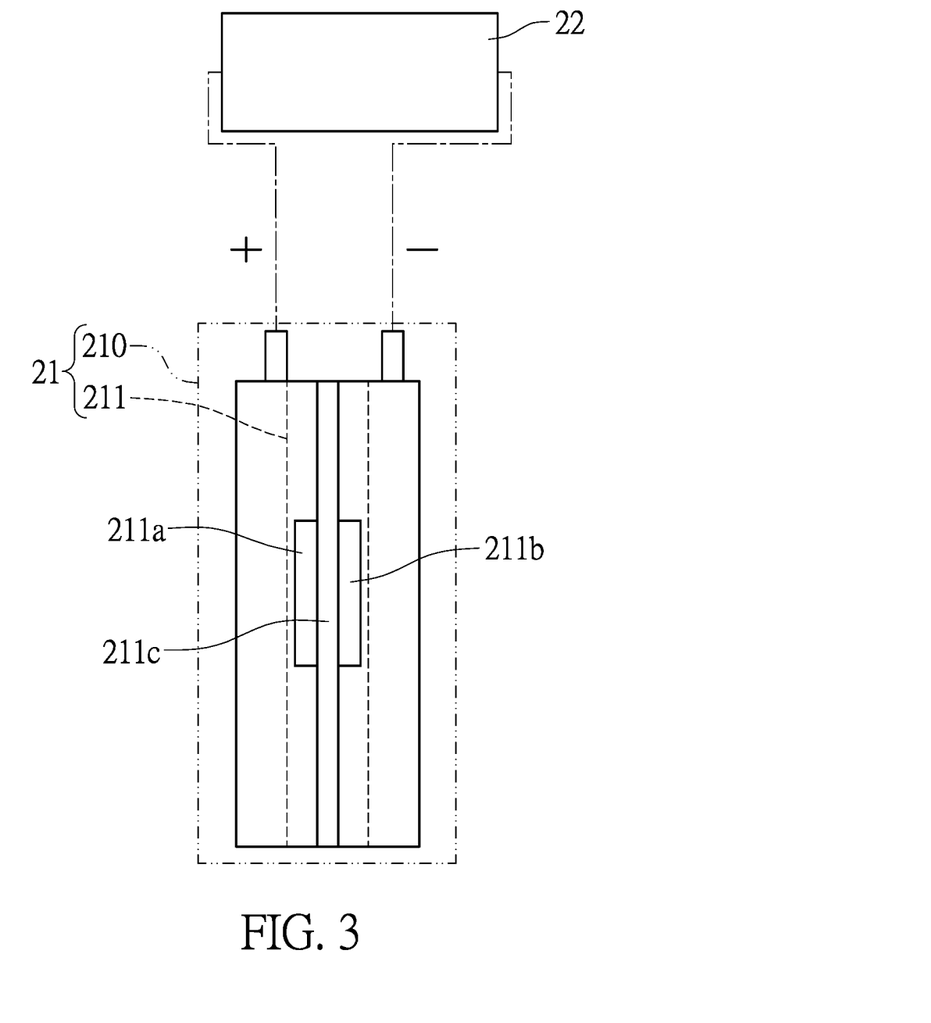
FIG. 3 is a schematic view of the water electrolyzing component of the embodiments of the instant disclosure.

Please refer to FIG. 2 and FIG. 3. FIG. 2 is a function block diagram of the electrolytic gas generator of the embodiments of the instant disclosure, and FIG. 3 is a schematic view of the water electrolyzing component of the embodiments of the instant disclosure.

The electrolytic gas generator 20 of the embodiment of the instant disclosure comprises a water electrolyzing component 21, an adjustable power supply 22 and a separator 23.

Please refer to FIG. 3. The water electrolyzing component 21 comprises an electrolyzer 210 and a membrane electrode set 211 disposed in the electrolyzer 210, in which the electrolyzer 210 is communicated to the pure water supplying device 40. The membrane electrode set 211 comprises an anode 211a, a cathode 211b and a proton exchange membrane 211c disposed between the anode 211a and the cathode 211b. In the present embodiment, the cathode 211b is platinum (Pt)/carbon black optionally coated on a carbon cloth. The material of the anode 211a is related to the gases to be generated and is described later.

Please refer to FIG. 2. The adjustable power supply 22 is electrically connected to the water electrolyzing component 21, i.e., the adjustable power supply 22 is electrically connected to the anode 211a and the cathode 211b for forming an electric circuit. When performing electrolysis, the adjustable power supply 22 provides a voltage value to the membrane electrode set 211 for electrolyzing water in the water electrolyzing component 21 to generate a first gas and a second gas at the anode 211a and the cathode 211b respectively, in which the second gas is hydrogen gas. After the electrolysis, the second gas (hydrogen gas) generated at the cathode 211b is mixed with water. Therefore, the second gas and water are separated by the separator 23, and the hydrogen separated from water is output.

The material constituting the anode 211a comprises an additive and a composition, in which the composition comprises perfluorinated sulfonic acid resin (Nafion), polytetrafluoroethylene (PTFE), sulfuric acid ($H_2SO_4$), carbon nanotubes and graphene. The perfluorinated sulfonic acid resin can be used as an adhesive and the polytetrafluoroethylene can be used for reinforcing the catalytic layer structure. In addition, the sulfuric acid can increase the porosity in the catalytic layer for enabling the water molecules to enter. The carbon nanotubes and the graphene increase the conductivity of the catalytic layer.

The additive can be selected form the group consisting of iridium, iridium black, iridium oxide, ruthenium, ruthenium oxide, platinum, platinum iridium, palladium, iridium ruthenium oxide, iridium-ruthenium-tantalum oxide, nickel-tin-antimony alloy, lead dioxide, glassy carbon, boron doped diamond, platinum tantalum oxide and any combination thereof.

The additive of the anode 211a and the voltage value applied to the membrane electrode set 211 are selected based on the first gas to be generated. For example, when the first gas generated at anode 211a is oxygen gas, the voltage value is less than 1.5V and the additive of the anode 211a is a catalyst that assists the generation of hydrogen gas and oxygen gas, such as iridium, iridium black, iridium oxide, ruthenium, ruthenium oxide, platinum, platinum iridium, palladium, iridium ruthenium oxide, iridium-ruthenium-tantalum oxide, and any combination thereof.

In another embodiment, when the first gas generated at the anode 211a comprises oxygen gas and ozone, the voltage value must be larger than 1.5V, and the additive of the anode 211a is a catalyst that assists the generation of ozone such as tin-antimony-nickel alloy, lead dioxide, glassy carbon, boron doped diamond, platinum tantalum oxide and any combination thereof.

In addition, at least a gas detector 30 and at least a liquid detector 31 are disposed in the storage cabinet 10. The numbers of the gas detector 30 and the liquid detector 31 can be determined according to actual need and are not limited in the instant disclosure.

In the present embodiment, a plurality of gas detectors 30 is disposed in the gas sterilization chamber 110, the gas preservation chamber 111 and the gas anti-oxidation chamber 112 respectively. These gas detectors 30 are for detecting the gases in the gas sterilization chamber 110, the gas preservation chamber 111 and the gas anti-oxidation chamber 112 and obtaining gas concentration information, in which the gas concentration information comprises a first gas concentration and a second gas concentration.

Similarly, the plurality of liquid detectors 31 is disposed in the liquid sterilization chamber 121, the liquid preservation chamber 120 and the liquid anti-oxidation chamber 122 respectively. The liquid detectors 31 are for detecting the liquid entering the water electrolyzing component 21, the liquid preservation chamber 120 and the liquid anti-oxidation chamber 122 for obtaining concentration detection information. The concentration detection information comprises a first dissolved gas concentration and a second dissolved gas concentration.

The control unit 90 is electrically connected to the electrolytic gas generator 20, the gas detector 30 and the liquid detector 31 for receiving the gas concentration information and the concentration detection information. Specifically, the control unit 90 can adjust the voltage value of the electrolytic gas generator 20 according to the gas concentration information to control the type of gases generated by the gas detector 30, and adjust the first gas concentration and the second gas concentration in the storage cabinet 10.

In addition, the control unit 90 is electrically connected to the adjustable power supply 22 for controlling the voltage value provided by the adjustable power supply 22, thereby adjusting the type of gases generated by the electrolytic gas generator 20. In other words, the first gas generated at the anode 211a can be selected to be oxygen gas or a mixed gas containing oxygen gas and ozone by controlling the voltage value of the electrolytic gas generator 20 through the control unit 90 and selecting a different anode 211a.

In addition, when the first gas comprises oxygen gas and ozone, the concentration ratio of oxygen gas and ozone is related to the voltage value. When the voltage value increases, the ratio of the ozone concentration in the first gas increases. Therefore, the ratio of the concentration of oxygen gas and ozone can be controlled while controlling the voltage value to be at least 1.5V by the control unit 90.

In an embodiment, after the control unit 90 receives the concentration detection information, the control unit 90 controls the voltage value of the adjustable power supply 22 to control the hydrogen concentration, oxygen concentration or ozone concentration in the hydrogen-rich water, water rich in oxygen and ozone or the mixed solution in predetermined ranges. For example, when the ozone concentration is too low, the control unit 90 controls the voltage value of the adjustable power supply 22 to be at least 1.5V for generating oxygen gas and ozone at the anode 211a, thereby increasing the concentration of ozone.

Please refer to FIG. 1. In the present embodiment, the food preservation system 1 further comprises a first gas storing unit 50, a second gas storing unit 60, a gas output unit 70 and a liquid output unit 80.

The first gas storing unit 50 and the second gas storing unit 60 both are communicated with the electrolytic gas generator 20 for storing the first gas and the second gas provided by the electrolytic gas generator 20 respectively.

Specifically, the first gas storing unit 50 is communicated with the electrolytic gas generator 20 and comprises an oxygen/ozone storing tank 51 and a first gas sensor 52. The first gas sensor 52 is disposed in the oxygen/ozone storing tank 51 for monitoring the concentration of oxygen gas and ozone in the oxygen/ozone storing tank 51. In addition, the first gas sensor 52 is electrically connected to the control unit 90 for transmitting the concentrations of oxygen gas and ozone to the control unit 90 continuously.

The control unit 90 processes the concentration signals of oxygen gas and ozone transmitted by the first gas sensor 52 for obtaining the ratio of the concentration of oxygen gas and ozone in the oxygen/ozone storing tank 51, and based on the concentration of oxygen gas and ozone, the control unit 90 judges whether or not the voltage value should be adjusted. For example, when the concentration of oxygen gas and ozone is lower than a first predetermined value, the control unit 90 controls the voltage value to be less than 1.5 V to increase the output of oxygen gas, thereby increasing the concentration of oxygen gas in the oxygen/ozone storing tank 51. When the concentration of oxygen gas and ozone is larger than a second predetermined value, the control unit 90 controls the voltage value to be larger than 1.5 V to increase the output of ozone, thereby increasing the concentration of ozone.

Similarly, the second gas storing unit 60 comprises a hydrogen storing tank 61 and a second gas sensor 62, in which the second gas sensor 62 is disposed in the hydrogen storing tank 61 for monitoring the concentration of hydrogen gas. The second gas detector 62 is also electrically connected to the control unit 90 and provides feedback of the measured hydrogen gas concentration to the control unit 90.

In the present embodiment, the first gas storing unit 50 and the second gas storing unit 60 are in fluid communication to the gas preserving area 11 of the storage cabinet 10 through the gas output unit 70, and the liquid output unit 80 is in fluid communication with the liquid preserving area 12 of the storage cabinet 10.

In other embodiments, the first gas and the second gas generated by the electrolytic gas generator 20 can be output to the storage cabinet 10 by directly passing it to the gas output unit 70 and the liquid output unit 80, and the first gas storing unit 50 and the second gas storing unit 60 are omitted.

The gas output unit 70 comprises a first guiding tube 71, a second guiding tube 72, a confluence tube 73, a first flow splitting control valve 74, a second flow splitting control valve 75 and a flow splitting pipeline 78.

The first gas storing unit 50 is communicated to the gas preserving area 11 through the first guiding tube 71, and the second gas storing unit 60 is communicated with the gas preserving area 11 through the second guiding tube 72. The first guiding tube 71 is communicated to the gas sterilization chamber 110 and the second guiding tube 72 is communicated to the gas anti-oxidation chamber 112. Therefore, the first gas and the second gas are input into the gas sterilization chamber 110 and the gas anti-oxidation chamber 112 through the first guiding tube 71 and the second guiding tube 72 respectively.

The confluence tube 73 is in fluid communication with the first guiding tube 71, the second guiding tube 72 and the gas preserving area 11, in which the first gas and the second gas are mixed to form a mixed gas passing through the confluence tube 73, and the mixed gas is output to the gas preserving area 11. In addition, the output end of the confluence tube 73 is communicated with the gas preserving area 11 for allowing the mixed gas to flow into the gas preserving area 11, thereby providing suitable gas for storing foods.

The first flow splitting control valve 74 is disposed at the junction of the confluence tube 73 and the first guiding tube 71. In the present embodiment, the control unit 90 is electrically connected to the first flow splitting control valve 74 for controlling the amount of the first gas flowing into the confluence tube 73. Similarly, the second flow splitting control valve 75 is disposed at the junction of the confluence tube 73 and the second guiding tube 72. In addition, the control unit 90 is electrically connected to the second flow splitting control valve 75 for controlling the amount of the second gas flowing into the confluence tube 73.

Therefore, the control unit 90 can control the amount of the first gas and the second gas through the first flow splitting control valve 74 and the second flow splitting control valve 75, thereby controlling the ratio of the concentrations of the first gas and the second gas in the mixed gas.

In addition, the gas output unit 70 further comprises a flow splitting control valve 76 disposed on the confluence tube 73, a drying tank 77 and a bypass pipeline (not numbered). The flow splitting control valve 76 is disposed at the junction of the bypass pipeline and the confluence tube 73, and the drying tank 77 is disposed between the flow splitting control valve 76 and the output end of the confluence tube 73. When the water in the mixed gas needs to be removed, the flow splitting control valve 76 can control the mixed gas to pass through the drying tank 77, then flow into the storage cabinet 10.

When the mixed gas does not need to undergo the water-removing process, the flow splitting control valve 76 controls the mixed gas to directly flow into the storage cabinet 10 through the bypass pipeline. The drying tank 77 and the bypass pipeline are optional components and can be selected according to actual need. The instant disclosure is not limited thereto.

Please refer to FIG. 1. In the present embodiment, the flow splitting pipeline 78 comprises a first flow splitting tube 78a and a second flow splitting tube 78b, in which the first flow splitting tube 78a is in fluid communication with the first guiding tube 71 and the confluence tube 73, and the second flow splitting tube 78b is in fluid communication with the second guiding tube 72 and the confluence tube 73. In addition, the first flow splitting tube 78a and the second flow splitting tube 78b are disposed at the output ends of the first guiding tube 71, the confluence tube 73 and the second guiding tube 72. Therefore, the first gas, the second gas and the mixed gas can be introduced into the gas preserving area 11 at different times and perform different preservation processes toward the foods.

For example, the control unit 90 can control the first flow splitting control valve 74 and the second flow splitting control valve 75 for allowing the first gas to enter the gas processing chambers through the flow splitting pipeline 78 and performing sterilization toward foods stored in different processing chambers. Afterwards, the control unit 90 allows the second gas to enter all the gas processing chambers through the second guiding tube 72 for performing an anti-oxidation process on the foods stored in different processing chambers. At last, the mixed gas is input into all the gas processing chambers to providing a better storing environment for the foods.

In another embodiment, other control valves can be disposed on the flow splitting pipeline 78 for performing different preservation processes on the foods. In addition, the flow splitting pipeline 78 can be omitted and is not a necessary component in the instant disclosure.

In addition, in the present embodiment, the liquid output unit 80 comprises a first water-gas mixing device 81, a second water-gas mixing device 82, a mixing tank 83, a first manifold 84, a third flow splitting control valve 85, a second manifold 86 and a fourth flow splitting control valve 87.

The first water-gas mixing device 81 is in fluid communication between the first gas storing unit 50 and the liquid preserving area 12. The first water-gas mixing device 81 is in fluid communication with the liquid sterilization chamber 121 through the first supply tube 81a. After the first water-gas mixing device 81 receives the first gas, the first gas is mixed with the water supplied into the first water-gas mixing device 81 and forms hydrogen-rich water or water rich in oxygen and ozone. Afterwards, the hydrogen-rich water or water rich in oxygen and ozone is output into the liquid sterilization chamber 121 of the liquid preserving area 12 through the first supply tube 81a.

The second water-gas mixing device 82 is in fluid communication between the hydrogen storing tank 61 and the liquid preserving area 12. Specifically, the second water-gas mixing device 82 is communicated to the liquid anti-oxidation chamber 122 through the second supply tube 82a. After the second water-gas mixing device 82 receives the second gas, the second gas is mixed with the water supplied into the second water-gas mixing device 82 to form hydrogen-rich water. Afterwards, the hydrogen-rich water can be input into the liquid anti-oxidation chamber 122 of the liquid preserving area 12 through the second supply tube 82a.

The mixing tank 83 is in fluid communication between the first gas storing unit 50, the second gas storing unit 60 and the liquid preserving area 12. The mixing tank 83 is in fluid communication with the liquid preservation chamber 120 through the third supply tube 83a. The mixing tank 83 receives the first gas and the second gas, and the first gas, the second gas and the water supplied into the mixing tank 83 are mixed with each other to form a mixed solution. The mixed solution can be input into the liquid preservation chamber 120 of the liquid preserving area 12 through a third supply tube 83a.

The first manifold 84 is disposed between the first gas storing unit 50, the first water-gas mixing device 81 and the mixing tank 83 for communicating the first gas storing unit 50, the first water-gas mixing device 81 and the mixing tank 83 with each other. In addition, the third flow splitting control valve 85 is disposed at the first manifold 84 for controlling the amount of the first gas flowing into the first water-gas mixing device 81 and the mixing tank 83.

Specifically, the third flow splitting control valve 85 is electrically connected to the control unit 90. Based on the concentration detection information received by the liquid detector 31, the control unit 90 controls the amount of the first gas output into the first water-gas mixing device 81 and the mixing tank 83 respectively.

Similarly, the second manifold 86 is disposed between the second gas storing unit 60, the second water-gas mixing device 82 and the mixing tank 83 for communicating the second gas storing unit 60, the second water-gas mixing device 82 and the mixing tank 83 with each other. In addition, the fourth flow splitting control valve 87 is disposed at the second manifold 86 for controlling the amount of the second gas flowing into the second water-gas mixing device 82 and the mixing tank 83.

In addition, the fourth flow splitting control valve 87 is electrically connected to the control unit 90. Based on the concentration detection information received by the liquid detector 31, the control unit 90 can control the amount of the second gas output into the second water-gas mixing device 82 and the mixing tank 83 through the fourth flow splitting control valve 87.

Please refer to FIG. 1. In the present embodiment, the connecting pipeline 88 is connected to the first supply tube 81a, the second supply tube 82a and the third supply tube 83a for communicating the first supply tube 81a, the second supply tube 82a and the third supply tube 83a with each other. The connecting pipeline 88 is connected to the output ends of the first supply tube 81a, the second supply tube 82a and the third supply tube 83a. Therefore, the mixed solution, oxygen-rich water (or water rich in oxygen and ozone) and hydrogen-rich water flowing out from the mixing tank 83, the first water-gas mixing device 81 and the second water-gas mixing device 82 are input into all the liquid processing chambers in the liquid preserving area 12 at different times respectively, thereby performing different preservation processes on the foods.

In summary, in the food preservation system 1 provided by the instant disclosure, the hydrogen gas, oxygen gas and ozone generated by the electrolytic gas generator are directly input into the storage cabinet, or are mixed with water to form hydrogen-rich water, oxygen-rich water (or water rich in oxygen and ozone) or a mixed solution, then the hydrogen-rich water, oxygen-rich water (or water rich in oxygen and ozone) or a mixed solution are input into the storage cabinet for performing preservation on the foods. Accordingly, the shelf life of the foods is extended. In addition, the food preservation system 1 of the instant disclosure can adjust the ratio of the gases input into the storage cabinet according to the types of foods, thereby providing suitable environments for storing the foods.

Therefore, in the food preservation system 1 provided by the embodiments of the instant disclosure, the gases generated by water electrolysis substitute for the use of chemicals for preserving foods, thereby avoid the problems related to residue chemicals on the foods.

The above-mentioned descriptions represent merely the exemplary embodiment of the present disclosure, without any intention to limit the scope of the instant disclosure thereto. Various equivalent changes, alterations or modifications based on the claims of the instant disclosure are all consequently viewed as being embraced by the scope of the instant disclosure.

What is claimed is:

1. A food preservation system, comprising:
a storage cabinet for storing foods;
an electrolytic gas generator in fluid communication with the storage cabinet, wherein the electrolytic gas generator outputs a first gas and a second gas to the storage cabinet for preserving the foods;
a gas detector disposed in the storage cabinet for detecting a gas in the storage cabinet and obtaining a gas concentration information, wherein the gas concentration information comprises a first gas concentration and a second gas concentration; and
a control unit electrically connected to the electrolytic gas generator and the gas detector, wherein the control unit adjusts a voltage value of the electrolytic gas generator according to the gas concentration information, and the control unit controls the type of gases generated by the electrolytic gas generator by adjusting the voltage value, and adjusts the concentrations of the first gas and the second gas in the storage cabinet.

2. The food preservation system according to claim 1, further comprising: a first gas storing unit and a second gas storing unit, wherein the first gas storing unit and the second gas storing unit are communicated to the electrolytic gas generator for storing the first gas and the second gas provided by the electrolytic gas generator.

3. The food preservation system according to claim 2, wherein an inner portion of the storage cabinet is divided into a gas preserving area and a liquid preserving area separated from the gas preserving area, the first gas storing unit and the second gas storing unit are in fluid communication with the gas preserving area through a gas output unit, and the first gas storing unit and the second gas storing unit are in fluid communication with the liquid preserving area through a liquid output unit.

4. The food preservation system according to claim 3, wherein the gas output unit comprises a first guiding tube in fluid communication with the first gas storing unit and a second guiding tube in fluid communication with the second gas storing unit, the first gas and the second gas are output to the gas preserving area through the first guiding tube and the second guiding tube respectively.

5. The food preservation system according to claim 4, wherein the gas output unit further comprises:
a confluence tube in fluid communication with the first guiding tube, the second guiding tube and the gas preserving area, wherein the first gas and the second gas are mixed through the confluence tube to form a mixed gas output to the gas preserving area;
a first flow splitting control valve disposed at the junction of the confluence tube and the first guiding tube, wherein the control unit is electrically connected to the first flow splitting control valve for controlling the amount of the first gas entering the confluence tube; and
a second flow splitting control valve disposed at the junction of the confluence tube and the second guiding tube, wherein the control unit is electrically connected to the second flow splitting control valve for controlling the amount of the second gas entering the confluence tube.

6. The food preservation system according to claim 5, wherein the gas output unit further comprises:
a first flow splitting tube in fluid communication with the first guiding tube and the confluence tube; and
a second flow splitting tube in fluid communication with the confluence tube and the second guiding tube;
wherein the first gas, the second gas and the mixed gas are input into the gas preserving area through the first flow splitting tube and the second flow splitting tube respectively.

7. The food preservation system according to claim 5, wherein the gas preserving area is divided into a gas sterilization chamber in fluid communication with the first guiding tube, a gas preserving chamber in fluid communication to the confluence tube and a gas anti-oxidation chamber in fluid communication with the second guiding tube, the gas sterilization chamber, the gas preserving chamber and the gas anti-oxidation chamber are separated from each other, the first gas flows into the gas sterilization chamber through the first guiding tube, the mixed gas flows into the gas preserving chamber through the confluence tube, and the second gas flows into the gas anti-oxidation through the second guiding tube.

8. The food preservation system according claim 7, further comprises: a plurality of gas detectors electrically connected to the control unit, the plurality of gas detectors is disposed in the gas sterilization chamber, the gas preserving chamber and the gas anti-oxidation chamber respectively, wherein the control unit controls the ratio of the first gas and the second gas input into the gas sterilization chamber, the gas preserving chamber and the gas anti-oxidation chamber through the first flow splitting control valve and the second flow splitting control valve according to the gas concentration information received by the plurality of gas detectors.

9. The food preservation system according to claim 3, wherein the second gas is hydrogen gas, when the voltage value is smaller than 1.5V, the first gas is oxygen gas, and when the voltage value is larger than 1.5V, the first gas comprises oxygen gas and ozone.

10. The food preservation system according to claim 9, wherein the liquid output unit comprises:
a first water-gas mixing device in fluid communication between the first gas storing unit and the liquid preserving area, wherein the first water-gas mixing device receives the first gas and the first water-gas mixing device outputs an oxygen-rich water or water rich in oxygen and ozone to the liquid preserving area through a first supply tube;
a second water-gas mixing device in fluid communication between the second gas storing unit and the liquid preserving area, wherein the second water-gas mixing device receives the second gas, and the second water-gas mixing device outputs a hydrogen-rich water to the liquid preserving area through a second supply tube; and
a mixing tank in fluid communication with the first gas storing unit, the second gas storing unit and the liquid preserving area, wherein the mixing tank receives the first gas and the second gas, and the mixing tank outputs a mixing solution to the liquid preserving area through a third supply tube.

11. The food preservation system according to claim 10, wherein the liquid preserving area is divided to a liquid sterilization chamber in fluid communication with the first supply tube, a liquid anti-oxidation chamber in fluid communication with the second supply tube, and a liquid preserving chamber in fluid communication with the third supply tube, the liquid sterilization chamber, the liquid anti-oxidation chamber and the liquid preserving chamber are separated from each other, the oxygen-rich water or water rich in oxygen and ozone passes through the first supply tube to flow into the liquid sterilization chamber, the hydrogen-rich water passes through the second supply tube to flow into the liquid anti-oxidation chamber, and the mixed solution passes through the third supply tube to flow into the liquid preserving chamber.

12. The food preservation system according to claim 11, wherein the liquid output unit further comprises:
a first manifold disposed between the first gas storing unit, the first water-gas mixing device and the mixing tank for communicating the first gas storing unit, the first water-gas mixing device and the mixing tank to each other;
a third flow splitting control valve disposed at the first manifold for controlling the amount of the first gas entering the first water-gas mixing device and the mixing tank;
a second manifold disposed between the second gas storing unit, the second water-gas mixing device and the mixing tank for communicating the second gas storing unit, the second water-gas mixing device and the mixing tank to each other; and
a fourth flow splitting control valve disposed at the second manifold for controlling the amount of the second gas entering the second water-gas mixing device and the mixing tank.

13. The food preservation system according to claim 12, further comprising a plurality of liquid detectors electrically connected to the control unit, the plurality of liquid detectors is disposed in the liquid sterilization chamber, the liquid preserving chamber and the liquid anti-oxidation chamber, wherein the control unit controls the ratio of the first gas and the second gas entering the first water-gas mixing device, the second water-gas mixing device and the mixing tank through the third flow splitting control valve and the fourth flow splitting control valve according to a concentration detecting information received by the plurality of liquid detectors.

14. The food preservation system according to claim 10, wherein the liquid output unit further comprises a connecting pipeline connecting the first supply tube, the second supply tube and the third supply tube to each other, wherein the oxygen-rich water, water rich in oxygen and ozone, the hydrogen-rich water or the mixed solution passes through the connecting pipeline for entering the liquid preserving area respectively.

15. The food preservation system according to claim 1, wherein the electrolytic gas generator is a proton exchange electrolytic gas generator and the proton exchange electrolytic gas generator comprises:
a water electrolyzing component comprising an electrolyzer and a membrane electrode set disposed in the electrolyzer, wherein the membrane electrode set comprises an anode, a cathode and a proton exchange membrane located between the anode and the cathode; and
an adjustable power supply electrically connected to the anode and the cathode for constituting an electric circuit, wherein the control unit is electrically connected to the adjustable power supply for adjusting the voltage value provided by the adjustable power supply.

16. The food preservation according to claim 15, wherein the anode comprises an additive and a composition, wherein the additive is selected from a group consisting of iridium, iridium black, iridium oxide, ruthenium, ruthenium oxide, platinum, platinum-iridium, palladium, iridium-ruthenium oxide, iridium-ruthenium-tantalum oxide, tin-antimony-nickel alloy, lead dioxide, glassy carbon, boron doped diamond, platinum-tantalum oxide and the combination thereof, and the composition comprises perfluorinated sulfonic acid resin, polytetrafluoroethylene, sulfuric acid, carbon nanotubes and graphene.

* * * * *